US012746939B2

(12) United States Patent
Marzorati et al.

(10) Patent No.: US 12,746,939 B2
(45) Date of Patent: Sep. 29, 2026

(54) VEHICLE AND MOBILITY PATH RECOMMENDATIONS

(71) Applicant: International Business Machines Corporation, Armonk, NY (US)

(72) Inventors: Mauro Marzorati, Lutz, FL (US); Carolina Garcia Delgado, Jalisco (MX); Jeremy R. Fox, Georgetown, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 333 days.

(21) Appl. No.: 17/935,814

(22) Filed: Sep. 27, 2022

(65) Prior Publication Data

US 2024/0101144 A1 Mar. 28, 2024

(51) Int. Cl.
*B60W 60/00* (2020.01)
*G07C 5/10* (2006.01)

(52) U.S. Cl.
CPC ............ *B60W 60/001* (2020.02); *G07C 5/10* (2013.01); *B60W 2554/402* (2020.02); *B60W 2555/20* (2020.02); *B60W 2556/10* (2020.02)

(58) Field of Classification Search
CPC ......... B60W 60/001; B60W 2554/402; B60W 2555/20; B60W 2556/10; B60W 60/007;
(Continued)

(56) References Cited

U.S. PATENT DOCUMENTS

| | | | |
|---|---|---|---|
| 8,965,621 B1 | 2/2015 | Urmson et al. | |
| 10,431,082 B2 | 10/2019 | Yaldo et al. | |

(Continued)

FOREIGN PATENT DOCUMENTS

| | | | | |
|---|---|---|---|---|
| CN | 114783170 A | 7/2022 | | |
| DE | 102017221901 A1 * | 6/2019 | ............. | H04W 4/44 |

OTHER PUBLICATIONS

"In-Motion Parking of Autonomous Vehicles in Parking Lots," IP.com PAD, IP.com No. IPCOM000261261D, Dated Feb. 14, 2020, pp. 1-2.

(Continued)

*Primary Examiner* — Erin M Piateski
*Assistant Examiner* — Hajar Hassaniardekani
(74) *Attorney, Agent, or Firm* — Kelsey M. Skodje, Esq.; Kevin P. Radigan, Esq.; Heslin Rothenberg Farley & Mesiti P.C.

(57) ABSTRACT

Techniques are provided for vehicle and mobility path recommendations. In one embodiment, the techniques involve identifying emergency response factors in historical telematics data, categorizing emergency situation outcomes based on the emergency response factors, identifying patterns between the emergency response factors and the emergency situation outcomes, generating a vehicle recommendation based on the identified patterns, determining a location of a vehicle referenced by the vehicle recommendation, generating a mobility path recommendation based on the vehicle recommendation and the location of the vehicle referenced by the vehicle recommendation, and transferring the vehicle recommendation and the mobility path recommendation to an emergency services entity.

20 Claims, 5 Drawing Sheets

(58) Field of Classification Search
CPC ...... G07C 5/10; G08G 1/0112; G08G 1/0129; G08G 1/0133; G08G 1/096775; G08G 1/096816; G08G 1/205; H04W 4/90; B60K 28/14
See application file for complete search history.

(56) References Cited

U.S. PATENT DOCUMENTS

| | | | |
|---|---|---|---|
| 11,341,848 B1 | | 5/2022 | Christensen et al. |
| 2012/0078506 A1* | | 3/2012 | Husain ............. G08G 1/096844 701/414 |
| 2015/0148988 A1 | | 5/2015 | Fleck |
| 2017/0030725 A1 | | 2/2017 | Gordon et al. |
| 2020/0005642 A1 | | 1/2020 | Kim |
| 2021/0041868 A1 | | 2/2021 | Fields et al. |
| 2021/0043061 A1* | | 2/2021 | Potter .................... G08B 21/02 |
| 2021/0162989 A1 | | 6/2021 | Ahn |
| 2021/0166565 A1 | | 6/2021 | Kumar et al. |
| 2021/0256841 A1 | | 8/2021 | Kane et al. |
| 2021/0287530 A1* | | 9/2021 | Reichardt ............. G06F 18/251 |
| 2021/0390256 A1* | | 12/2021 | Liu ....................... G06F 18/254 |
| 2022/0157165 A1 | | 5/2022 | Dantrey et al. |
| 2024/0105055 A1 | | 3/2024 | Marzorati et al. |

OTHER PUBLICATIONS

Automotive 2025: Industry Without Borders, Retrieved from: https://www.ibm.com/downloads/documents/us-en/10a99803fa2fdb61, Jan. 2015, 20 pages.
Automotive Industry Technology Solutions, Retrieved from: https://web.archive.org/web/20250906104151/https://www.ibm.com/industries/automotive, Sep. 6, 2025, 12 pages.
Automotive OEM's, Retrieved from: https://web.archive.org/web/20220517004448/https://www.autodrivetech.com/solutions/automotive-oems/, May 17, 2022, 5 pages.
Driving Innovation for Connected Cars Using IBM Cloud, Retrieved from: https://web.archive.org/web/20200514220648/https://www.ibm.com/blogs/cloud-computing/2020/02/04/driving-innovation-connected-cars-ibm-cloud/, Feb. 4, 2020, 6 pages.
IBM Industry Solutions, Retrieved from: https://www.ibm.com/industries, Sep. 29, pages.
IoT solutions, Retrieved from: https://web.archive.org/web/20250906105825/https://www.ibm.com/solutions/internet-of-things, Sep. 6, 2025, 1 page.
Only getting isolated results? Retrieved from: https://web.archive.org/web/20250905141759/https://www.ibm.com/artificial-intelligence, Sep. 5, 2025, 12 pages.
"List of IBM Patents or Patent Applications Treated as Related," for U.S. Appl. No. 17/935,814, filed Sep. 27, 2022.

* cited by examiner

VEHICLE AND MOBILITY PATH RECOMMENDATIONS

BACKGROUND

The present invention relates to autonomous vehicle operation, and more specifically, to using vehicle telematics to coordinate the operation of autonomous vehicles in emergency situations.

SUMMARY

A method is provided according to one embodiment of the present disclosure. The method includes identifying emergency response factors in historical telematics data; categorizing emergency situation outcomes based on the emergency response factors; identifying patterns between the emergency response factors and the emergency situation outcomes; generating a vehicle recommendation based on the identified patterns; determining a location of a vehicle referenced by the vehicle recommendation; generating a mobility path recommendation based on the vehicle recommendation and the location of the vehicle referenced by the vehicle recommendation; and transferring the vehicle recommendation and the mobility path recommendation to an emergency services entity.

A system is provided according to one embodiment of the present disclosure. The system includes a processor; and memory or storage comprising an algorithm or computer instructions, which when executed by the processor, performs an operation that includes: identifying emergency response factors in historical telematics data; categorizing emergency situation outcomes based on the emergency response factors; identifying patterns between the emergency response factors and the emergency situation outcomes; generating a vehicle recommendation based on the identified patterns; determining a location of a vehicle referenced by the vehicle recommendation; generating a mobility path recommendation based on the vehicle recommendation and the location of the vehicle referenced by the vehicle recommendation; and transferring the vehicle recommendation and the mobility path recommendation to an emergency services entity.

A computer-readable storage medium having computer-readable program code embodied therewith, the computer-readable program code executable by one or more computer processors to perform an operation, is provided according to one embodiment of the present disclosure. The operation includes identifying emergency response factors in historical telematics data; categorizing emergency situation outcomes based on the emergency response factors; identifying patterns between the emergency response factors and the emergency situation outcomes; generating a vehicle recommendation based on the identified patterns; determining a location of a vehicle referenced by the vehicle recommendation; generating a mobility path recommendation based on the vehicle recommendation and the location of the vehicle referenced by the vehicle recommendation; and transferring the vehicle recommendation and the mobility path recommendation to an emergency services entity.

DETAILED DESCRIPTION

Figure 1:
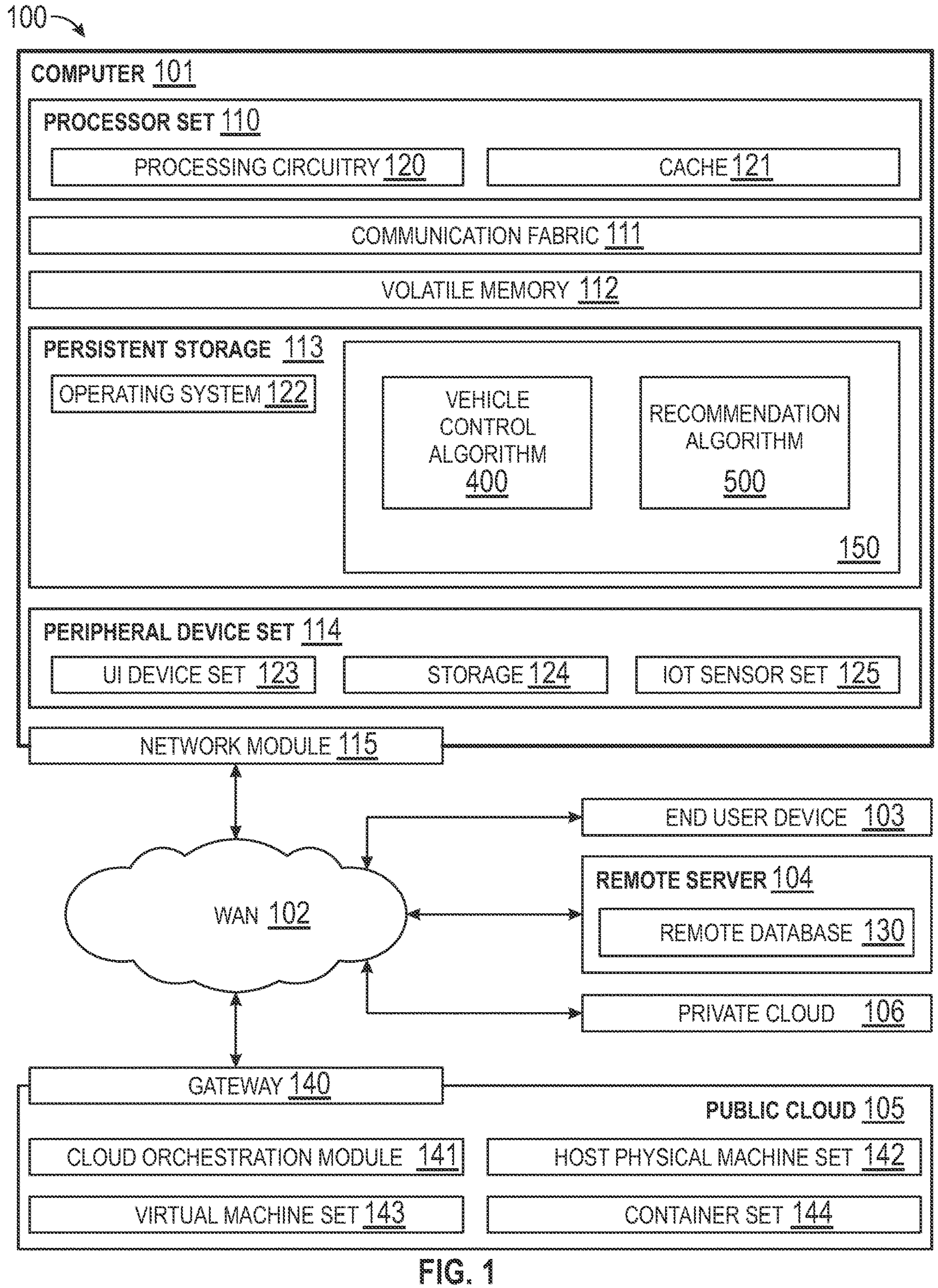
FIG. 1 illustrates a computing environment, according to one embodiment.

Traditional vehicle telematics systems monitor vehicles to provide services such as GPS navigation, roadside assistance, or emergency services contact. However, these vehicle telematics systems are unable to coordinate the operation of passenger vehicles to assist in emergency situations.

Embodiments of the present disclosure improve upon telematics systems by coordinating the operation of passenger vehicles based on the type of emergency to ensure that appropriate emergency response vehicles have an open mobility path to an emergency site and related points of interest. In one embodiment, the telematics system moves the passenger vehicles to temporary parking spaces, or guides the passenger vehicles in an orbital loop, away from the mobility path. In another embodiment, the telematics system optimizes the coordination of passenger vehicle operations, and recommends emergency response vehicle selections and mobility paths to emergency services entities, based on historical telematics data.

One benefit of the disclosed embodiments is to decrease the response time of emergency response vehicles by providing unimpeded access to emergency sites and related points of interest. Further, embodiments of the present disclosure can improve the effectiveness of emergency services by recommending emergency response vehicle selection to emergency services entities.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to one embodiment. Computing environment 100 contains an example of an environment for the execution of at least some of the computer code involved in performing the inventive methods, such as the improved vehicle coordinator 150. In addition to vehicle coordinator 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and vehicle coordinator 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in vehicle coordinator 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in vehicle coordinator 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geograph-ically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that col-lect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, de-ploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be dis-connected from the internet entirely and only accessible through a local/private network. A hybrid cloud is a composition of multiple clouds of different types (for example, private, com-munity or public cloud types), often respectively implemented by different vendors. Each of the multiple clouds remains a separate and discrete entity, but the larger hybrid cloud architec-ture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
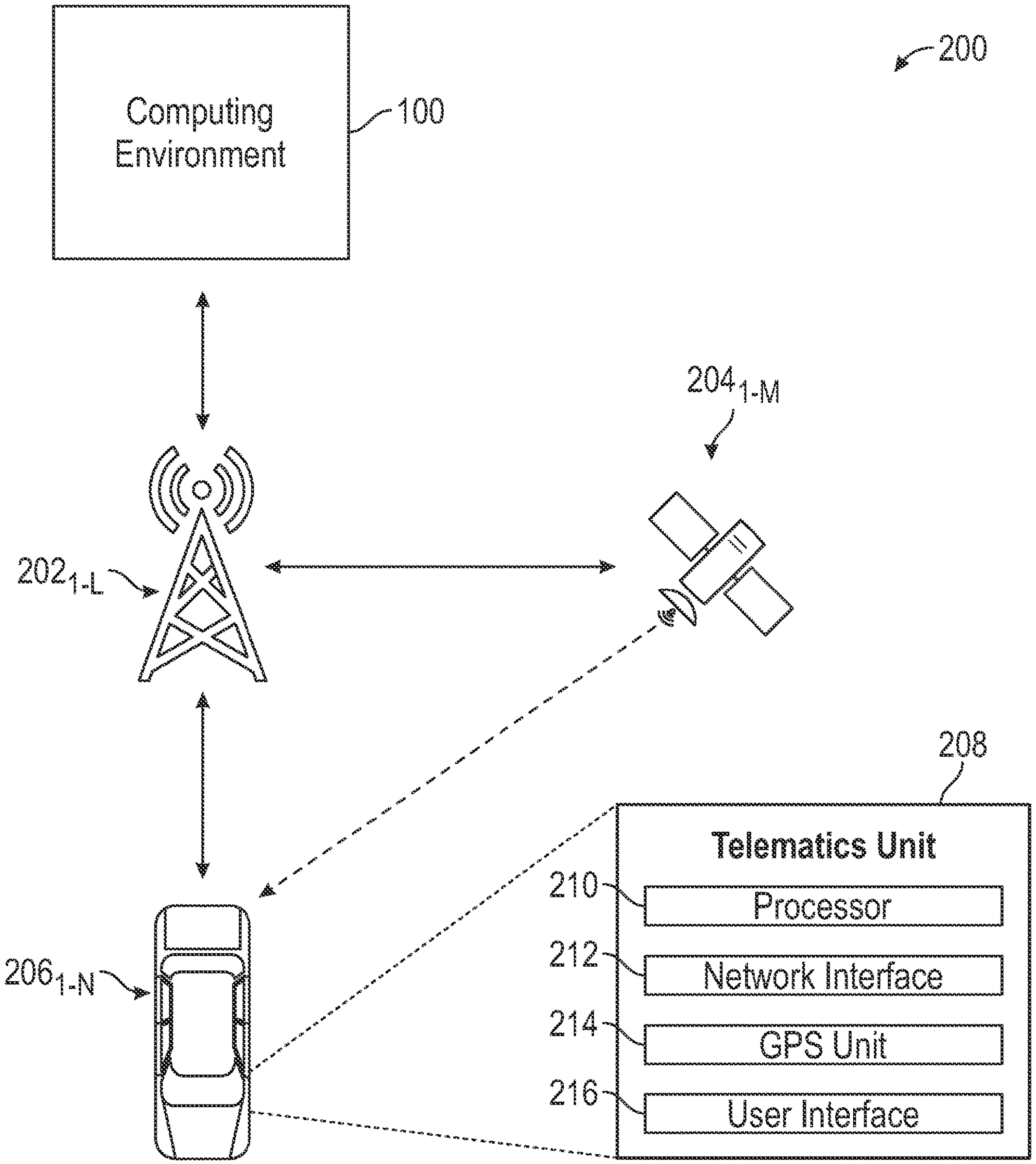
FIG. 2 illustrates a telematics operating environment, according to one embodiment.

FIG. 2 illustrates a telematics operating environment 200, according to one embodiment. In the illustrated embodiment, the telematics operating environment 200 includes communication towers $\mathbf{202}_{1\text{-}L}$, satellites $\mathbf{204}_{1\text{-}M}$, vehicles $\mathbf{206}_{1\text{-}N}$, and computing environment 100

The communication towers $\mathbf{202}_{1\text{-}L}$ can include cell towers that enable communications between the computing environment 100, satellites $\mathbf{204}_{1\text{-}M}$, and vehicles $\mathbf{206}_{1\text{-}N}$. In one embodiment, communications via the cell towers conform to cellular standards such as 4G, 5G, LTE, GSM, CDMA, and the like.

The satellites $\mathbf{204}_{1\text{-}M}$ can track the location of the vehicles $\mathbf{206}_{1\text{-}N}$, and send GPS data to the vehicles $\mathbf{206}_{1\text{-}N}$. Further, the satellites $\mathbf{204}_{1\text{-}M}$ can transmit telematics data between the computing environment 100 and the vehicles $\mathbf{206}_{1\text{-}N}$.

Each of the vehicles $\mathbf{206}_{1\text{-}N}$ can be classified as fully autonomous, semi-autonomous, or non-autonomous. As used herein, "autonomous" refers to both fully and semi-autonomous vehicles. Generally, autonomous vehicles have at least partially automated driving, whereas non-autonomous vehicles offer no driving assistance.

Each of the vehicles $\mathbf{206}_{1\text{-}N}$ can also include a telematics unit 208. The telematics unit 208 generally includes a processor 210, network interface 212, GPS unit 214, and user interface 216. Not all components of the telematics unit 208 are shown.

The processor 210 generally obtains instructions and data via a bus from a memory or storage. Telematics unit 208 is generally under the control of an operating system (OS) suitable to perform or support the functions or processes disclosed herein. The processor 210 is a programmable logic device that performs instruction, logic, and mathematical processing, and may be representative of one or more CPUs. The processor may execute one or more algorithms, instruction sets, or applications in the memory or storage to perform the functions or processes described herein.

The memory or storage can be representative of hard-disk drives, solid state drives, flash memory devices, optical media, and the like. The storage can also include structured storage, e.g., a database. In addition, the memory or storage may be considered to include memory physically located elsewhere; for example, on another computer communicatively cou-pled to the telematics unit 208 via the bus or a network.

The telematics unit 208 can include a network interface 212 to connect to other computers (e.g., distributed databases, servers, or web-hosts) via a network. The network can comprise, for example, the Internet, a local area network, a wide area network, or a wireless network. The network can include any combination of physical transmission cables, optical transmission fibers, wireless transmission, routers, firewalls, switches, gateway computers and/or edge servers. The network interface 212 may be any type of network communications device allowing the telematics unit 208 to communicate with other computers via the network. The network interface 212 may exchange data with the network. In one embodiment, the telematics unit 208 transmits telematics information to the computing environment 100, and receives driving instructions from the computing environment 100, via the network interface 212.

In the illustrated embodiment, the GPS unit 214 receives driving instructions generated by the computing environment 100 via the network interface 212. The GPS unit 214 can also receive GPS data from the satellites $\mathbf{204}_{1\text{-}M}$ via the network interface 212. Using the GPS data, the GPS unit 214 can calculate its position on a map, and generate driving directions to a target location.

The user interface 216 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. In one embodiment, the telematics unit 208 is integrated with an electrical system of a vehicle, and user interface 216 includes an interactive touchscreen, physical buttons and a display, a projection system, or the like, to convey telematics information to the user visually. The user interface 216 can also include a sound system that conveys telematics information to the user audibly. In another embodiment, the telematics unit 208 is a standalone system such as a smartphone or electronic gadget. In such embodiments, the user interface 216 can include features native to these platforms.

The computing environment 100 can include vehicle coordinator 150, which implements a vehicle control algorithm 400 and a recommendation algorithm 500 to carry out the operations described herein. In one embodiment, the vehicle coordinator 150 is software module stored in the persistent memory 113. The vehicle control algorithm 400 and the recommendation algorithm 500 are sets of computer instructions executed by the processor set 110.

In one embodiment, the computing environment 100 operates as a telematics cloud server that coordinates the movement of the vehicles $\mathbf{206}_{1\text{-}N}$ in emergency situations. The computing environment 100 can receive information about the emergency situations from an emergency services entity (e.g., a fire department, police department, medical services, or the like) or from the vehicles $\mathbf{206}_{1\text{-}N}$. Using the emergency situation information and information about the vehicles $\mathbf{206}_{1\text{-}N}$, the vehicle control algorithm 400 can identify mobility paths for emergency response vehicles dispatched to the emergency site. As used herein, a "mobility path" refers to a pathway to a point of interest, a buffer zone, or an emergency site, that is unimpeded by vehicles. The vehicle control algorithm 400 can then move the vehicles $\mathbf{206}_{1\text{-}N}$, or instruct the vehicles $\mathbf{206}_{1\text{-}N}$ to move, away from the mobility path or emergency site. This process is described in greater detail in FIG. 4 below.

In another embodiment, the recommendation algorithm 500 can store historical data about emergency response factors for previous emergency situations. These factors include the types and durations of the emergency situations, weather conditions, emergency vehicle types and response times, or the like. The recommendation algorithm 500 can assess these factors to identify which type of emergency response vehicles provided optimal performance for a given combination of factors. The recommendation algorithm 500 can then make a recommendation to an emergency services entity for the type of emergency response vehicle to dispatch, as well as a recommendation for the optimal mobility path for the emergency response vehicle to follow. This process is described in greater detail in FIG. 5 below.

Figure 3:
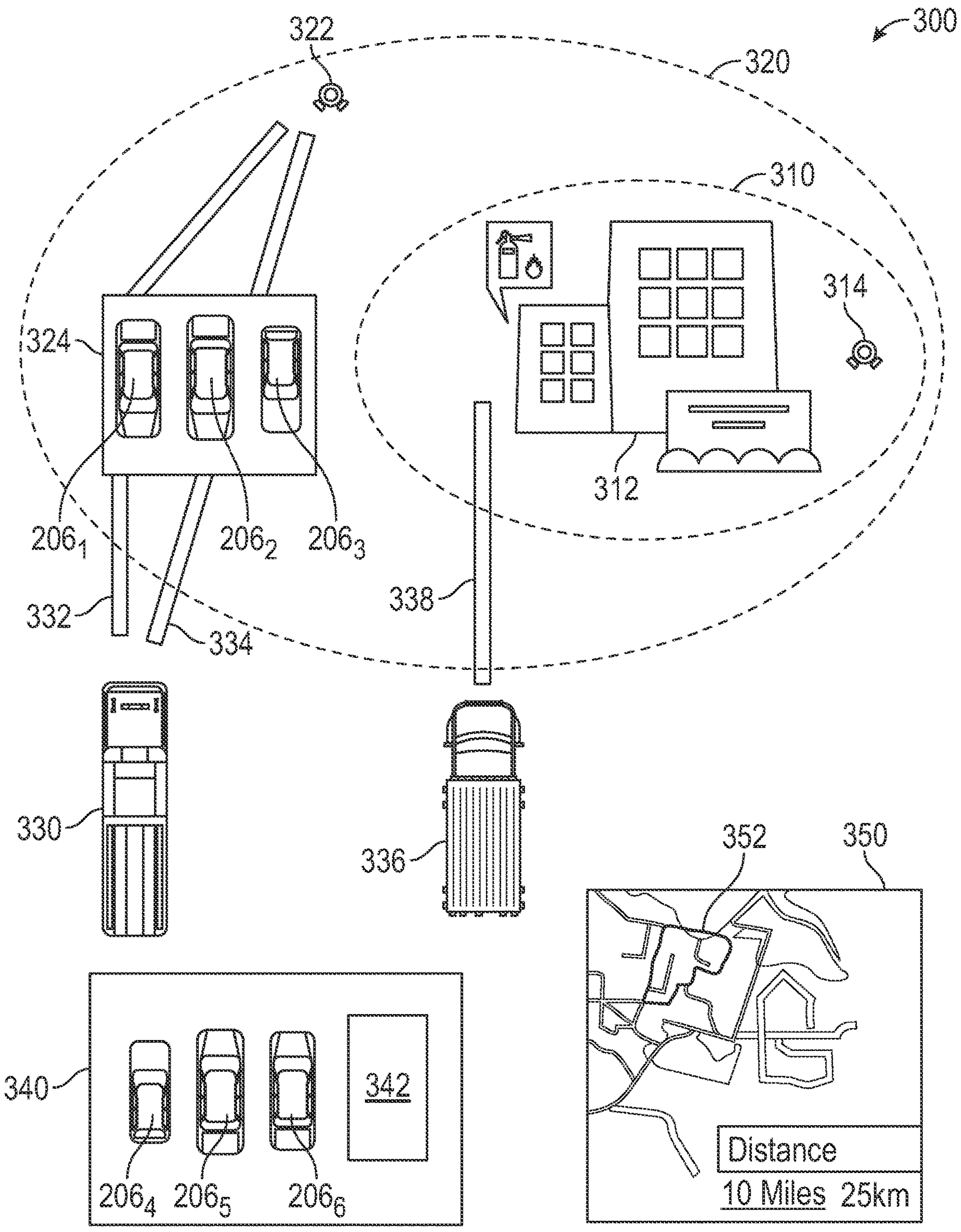
FIG. 3 illustrates a telematics operating environment, according to one embodiment.
Figure 4:
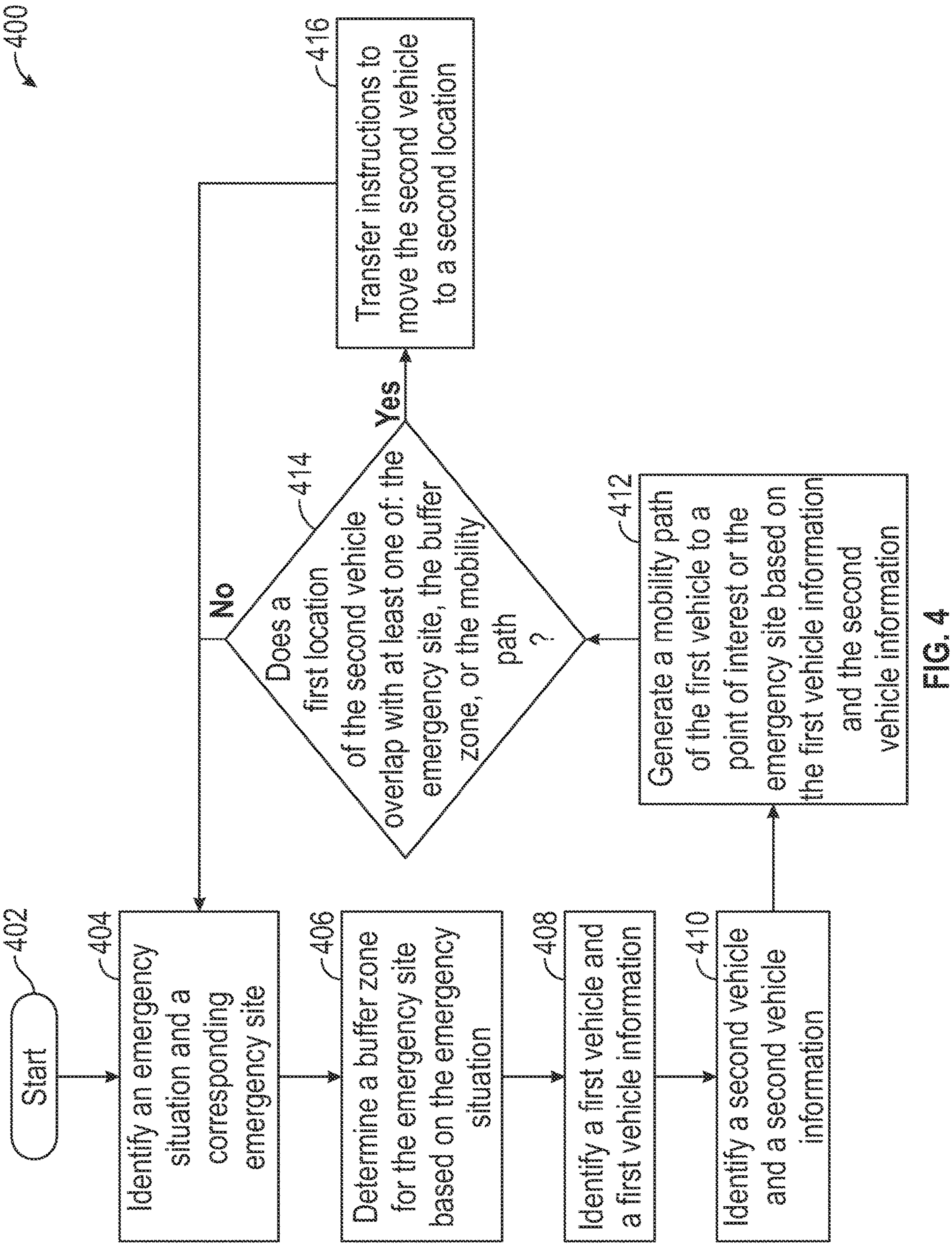
FIG. 4 illustrates a flowchart of a method of implementing a vehicle control algorithm, according to one embodiment.

FIG. 3 illustrates a telematics operating environment 300, according to one embodiment. FIG. 4 illustrates a flowchart of a method of implementing a vehicle control algorithm 400, according to one embodiment. This method represents one example by which the vehicle control algorithm 400 can generate a mobility path, and ensure that the mobility path remains free from obstruction by vehicles at an emergency location. FIG. 3 is explained in conjunction with FIG. 4.

The method begins at block 402. At block 404, the vehicle coordinator 150 identifies an emergency situation and a corresponding emergency site. As used herein, "emergency situation" can refer to any scenario that warrants a response from government entities such as the police, fire department, emergency medical services, animal control, and the like.

In one embodiment, the vehicle coordinator 150 identifies the emergency situation and the emergency site 310 from a signal received from a national or local government alert system. The signal can be an alert, broadcast, message, or other encapsulation of data that includes information about the emergency situation and emergency site 310. The information included in the signal can include, for example, the type of emergency situation (fire outbreak, occurrence of natural disasters, wide-spread human injury, and the like), GPS coordinates or other location information of the emergency site 310, identification and location information of points of interest pertinent to the emergency type, or the like.

In the embodiment illustrated in FIG. 3, the emergency situation is a fire at building 312. The location of the emergency site 310. Point of interest 314 and point of interest 322 are fire hydrants in the vicinity.

At block 406, the vehicle coordinator 150 determines a buffer zone 320 for the emergency site 310 based on the emergency situation. Generally, the buffer zone 320 serves as an area that includes additional points of interests and space to aid emergency response vehicles in carrying out emergency operations. In the embodiment illustrated in FIG. 3, the vehicle coordinator 150 determines the buffer zone 320 to be an area defined by maximum and minimum distance from the emergency site 310 that includes point of interest 322 and a predetermined distance.

At block 408, the vehicle coordinator 150 identifies a first vehicle and a first vehicle information. The first vehicle can be an emergency response vehicle, or any other vehicle used to aid in resolving the emergency situation. The first vehicle information can include information about autonomous capabilities, location, size, weight, physical dimensions, or the like, of the first vehicle.

In one embodiment, the vehicle coordinator 150 identifies the first vehicle and the first vehicle information from the signal received from the government alert system. The signal can include, for example, the type and location of the first vehicle. In the embodiment illustrated in FIG. 3, the vehicle coordinator 150 identifies a first set of vehicles, including fire truck 330 and ambulance 336.

In another embodiment, the vehicle coordinator 150 can identify the first vehicle and the first vehicle information by analyzing images and audio, and location information, provided by the vehicles $206_{1-N}$. The vehicles $206_{1-N}$ can be equipped with cameras and microphones to capture images and audio from the surrounding environment. When the cameras and microphones capture images of multiple emergency response vehicles in proximity with one another, or audio of sirens from these emergency response vehicles, vehicles $206_{1-N}$ can send the images, audio, and their location information to the vehicle coordinator 150. The vehicle coordinator 150 can use the images and audio to identify the first vehicle and a type of emergency situation. Further, the vehicle coordinator 150 can use the location information of the vehicles $206_{1-N}$ to estimate the location of the first vehicle.

At block 410, the vehicle coordinator 150 identifies a second vehicle and a second vehicle information. The second vehicle information can include information about the autonomous capabilities, location, make and model, size, weight, physical dimensions, or the like, of the second vehicle.

In on embodiment, the vehicle coordinator 150 identifies a second set of vehicles and a second set of vehicle information. The second set of vehicles includes vehicles $206_{1-3}$. Vehicle $206_1$ is non-autonomous, and does not include an integrated telematics unit 208. Vehicle $206_2$ and vehicle $206_3$ are autonomous, and each include an integrated telematics unit 208. Each telematics unit 208 runs software that interacts with the vehicle coordinator 150. Vehicle $206_2$ and vehicle $206_3$ can send the vehicle coordinator 150 vehicle identifications and GPS coordinates, which the vehicle coordinator 150 uses to identify the respective vehicles and their locations.

Although, vehicle **206*i* may not include an integrated telematics unit 208, if a driver is present to operate vehicle $206_1$, and has a smartphone or electronic gadget can interact with vehicle coordinator 150, then the vehicle coordinator 150 can use the smartphone or electronic gadget as a telematics unit 208** to perform the processes described above.

At block 412, the vehicle coordinator 150 generates a mobility path of the first vehicle to a point of interest or the emergency site 310 based on the first vehicle information and the second vehicle information. As previously mentioned, a "mobility path" refers to a pathway to a point of interest, a buffer zone, or an emergency site, that is unimpeded by vehicles. In one embodiment, the mobility path is predictive of an open, unimpeded pathway subject to the control of autonomous vehicles as described in detail below.

The vehicle coordinator 150 can use the first vehicle information to optimize the mobility path of the first vehicle. For instance, if the first vehicle is a police motorcycle, then the size, weight, and dimensions of the motorcycle may allow the mobility path to include a route on a ramp that runs along a building. In comparison, if the first vehicle is a fire truck, the mobility path may only be routed through wide, open spaces.

The vehicle coordinator 150 can also consider the second vehicle information to optimize the mobility path of the first vehicle. For example, if the second vehicle is non-autonomous or does not include a telematics unit 208 to aid in changing locations, the vehicle coordinator 150 can consider the location and size of the second vehicle to generate a mobility path that circumvents the second vehicle.

In the embodiment illustrated in FIG. 3, the vehicle coordinator 150 generates a first potential mobility path 332 of the fire truck 330. The first potential mobility path 332 extends from the fire truck 330 to point of interest 322. However, the first potential mobility path 332 overlaps an area occupied with a first parking lot 324, which includes vehicles $206_{1-3}$.

The vehicle coordinator 150 can use vehicle information of vehicle $206_1$ to assess the viability of the first potential mobility path 332. In one embodiment, the vehicle coordinator 150 uses the size and location of vehicle $206_1$ to determine that vehicle $206_1$ obstructs the first potential mobility path 332. The vehicle coordinator 150 also uses the autonomous capabilities information to determine that vehicle $206_1$ is non-autonomous, and does not have a nearby driver with a smartphone that can operate as a telematics unit 208. Therefore, the vehicle coordinator 150 determines that vehicle $206_1$ cannot be relocated. A similar assessment can be done for vehicles $206_2$ and $206_3$ to determine that they can be relocated so as not to obstruct a mobility path in their present location. Thus, the vehicle coordinator 150 reroutes the first potential mobility path 332 to generate the first mobility path 334, which is not obstructed by vehicles that cannot be relocated.

A second mobility path 338 extends from the ambulance 336 to the emergency site 310. As shown, the second mobility path 338 is unimpeded by any vehicles.

At block 414, upon determining that a first location of the second vehicle does not overlap with at least one of: the emergency site, the buffer zone, or the mobility path, the method proceeds to block 404, where the method repeats as described above. However, if the first location of the second vehicle does overlap with the emergency site, the buffer zone, or the mobility path, the method proceeds to block 416.

In the embodiment illustrated in FIG. 3, vehicles $\mathbf{206}_{1\text{-}3}$ are located in the buffer zone 320. Further, vehicles $\mathbf{206}_{2\text{-}3}$ obstruct the first mobility path 334.

At block 416, the vehicle coordinator 150 transfers instructions to move the second vehicle to a second location. In one embodiment, the vehicle coordinator 150 coordinates the movement of the vehicles $\mathbf{206}_{1\text{-}3}$ by instructing each vehicle to follow a specific route, time of departure, driving speed, and the like. In this manner, the vehicles $\mathbf{206}_{1\text{-}3}$ can remove them-selves as potential obstacles to resolving the emergency situation.

The movement instructions can be optimized based on the priority or severity of the emergency situation. In one embodiment, the priority of a given emergency situation is identified from the signal received from the government alert system. For example, the signal can indicate that a rescue operation of the ambulance 336 has a higher priority than the fire sup-pression of the fire truck 330. Therefore, the vehicle coordinator 150 may issue instructions to the vehicles $\mathbf{206}_{1\text{-}3}$ to remain in place until the ambulance 336 has completed travel along the second mobility path 338. As an alternative, the vehicle coordinator 150 may issue instructions for the vehicles $\mathbf{206}_{1\text{-}3}$ to move in such a way as to avoid any obstruction of the second mobility path 338.

In the embodiment illustrated in FIG. 3, the vehicle coordinator 150 ignores vehicle $\mathbf{206}_{1}$, since it is non-autonomous and lacks the telematics unit 208 or equivalent to receive or follow the instructions. The vehicle coordinator 150 can instruct vehicle $\mathbf{206}_{2}$ to move to a second parking lot 340, and park in space 342. The vehicle coordinator 150 can also instruct vehicle $\mathbf{206}_{3}$ to drive along an orbital route 352, where vehicle $\mathbf{206}_{3}$ will drive in the route until parking is available or the emergency situation is resolved. After the emergency situation is resolved, the vehicle coordinator 150 can assess whether the vehicle $\mathbf{206}_{2\text{-}3}$ can safely return to their original locations, and issue movement instructions accordingly. After block 416, the method proceeds to block 404, where the method repeats as described above.

Figure 5:
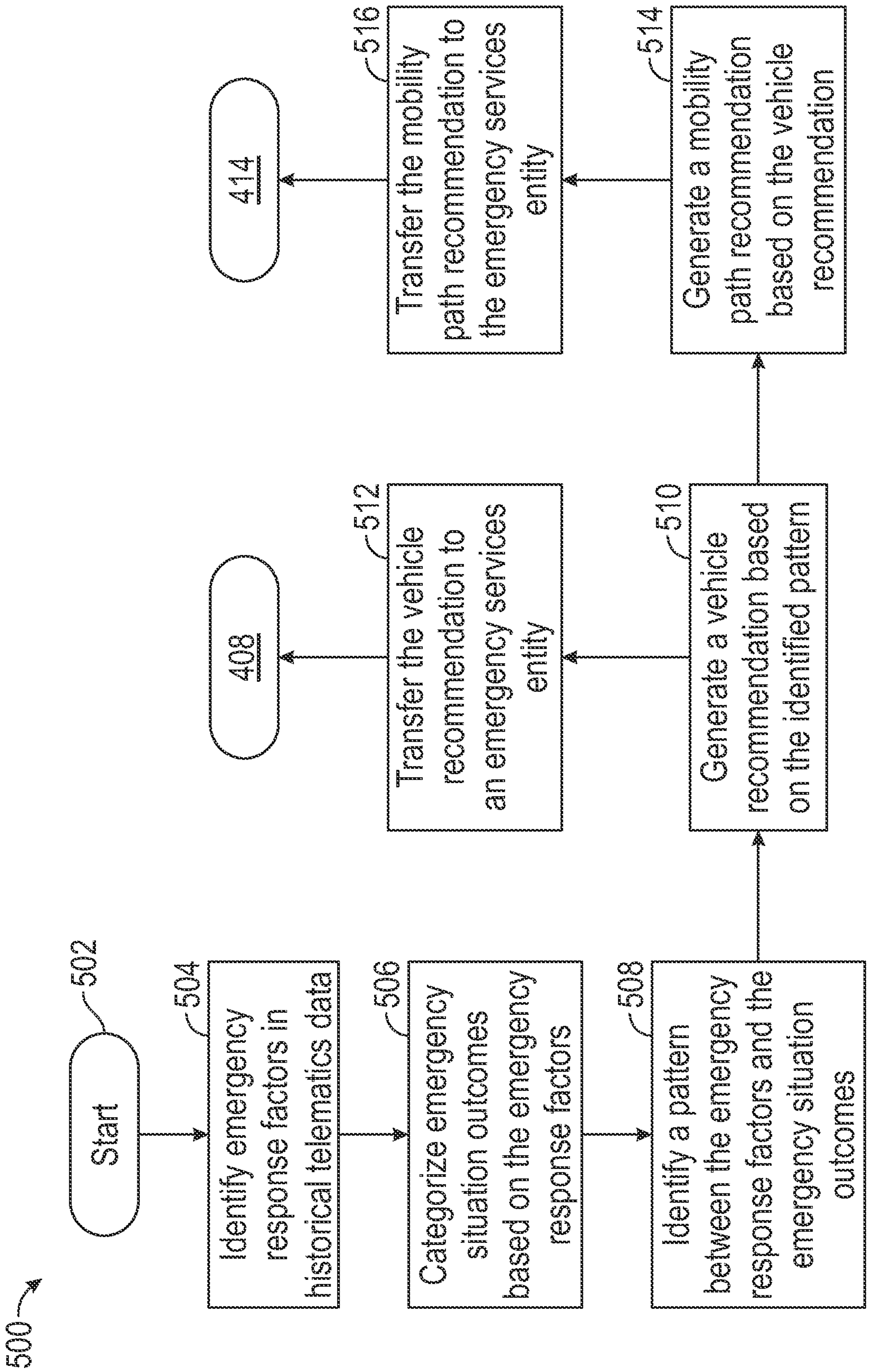
FIG. 5 illustrates a flowchart of a method of implementing a recommendation algorithm, according to one embodiment.

FIG. 5 illustrates a flowchart of a method of implementing a recommendation algorithm 500, according to one embodiment. This method represents one example by which the recommendation algorithm 500 can use historical telematics data about emergency response factors to generate vehicle recommendations and mobility path recommendations for emergency services entities. As used herein, "historical telematics data" references all recorded or stored data from prior emergency situations.

The method begins at block 502. In one embodiment, the vehicle coordinator 150 identifies emergency response factors for each emergency situation in the historical telematics data. The emergency response factors can include an emergency response vehicle type, emergency situation duration, emergency situation type, emergency vehicle response time, traffic conditions, weather conditions, or the like.

At block 506, the vehicle coordinator 150 categorizes an emergency situation outcome based on the emergency response factors. In one embodiment, the vehicle coordinator 150 implements a machine learning model to categorize emergency situation outcomes of each emergency situation in the historical telematics data. The machine learning model can be an algorithm or set of computer instructions executed by the processor set 110. The vehicle coordinator 150 can use a supervised learning process to train the model to categorize each emergency situation outcome as positive or negative for a given set of emergency response factors.

At block 508, the vehicle coordinator 150 identifies a pattern between the emergency response factors and the emergency situation outcomes. In one embodiment, the vehicle coordinator 150 generates a knowledge graph to identify multiple patterns. The nodes of the knowledge graph can represent the emergency response factors and emergency situation outcomes. The edges of the knowledge graph can represent the strength of a correlation between a given emergency response factor and an emergency situation outcome.

In one embodiment, the weights of the edges (i.e., the number of connections) between the pertinent nodes can be increased for each occurrence of an emergency response factor and an emergency situation outcome in the historical telematics data. Thus, the vehicle coordinator 150 can identify the patterns between the emergency response factors and the emergency situation outcomes by identifying the edges with the greatest weights.

At block 510, the vehicle coordinator 150 generates a vehicle recommendation based on the identified patterns. In one embodiment, the vehicle coordinator 150 uses the weights of the knowledge graph to determine which types of emergency response vehicles have positive emergency situation outcomes given other emergency response factors.

For example, the vehicle coordinator 150 may determine that the edges between a node representing a small fire truck without ladders, a node representing icy roads, and a node representing the positive emergency situation outcomes are heavily weighted. Therefore, the vehicle coordinator 150 can determine that small fire trucks without ladders traveling on icy roads are strongly correlated with positive emergency situation outcomes. Thus, if the emergency response factors of a present emergency situation involve a fire outbreak during winter, the vehicle coordinator 150 may recommend that small fire trucks without ladders are selected for dispatch.

At block 512, the vehicle coordinator 150 transfers the vehicle recommendation to an emergency services entity. The recommendation includes the type of emergency response vehicle to select for dispatch to a present emergency situation given present emergency response factors. The method then proceeds to block 408 of FIG. 4, where the vehicle control algorithm 400 performs as describe above.

Returning to FIG. 5, at block 514, the vehicle coordinator 150 generates a mobility path recommendation based on the vehicle recommendation. In one embodiment, the vehicle coordinator 150 has the vehicle information of the recommended emergency response vehicle prior to the dispatch of the vehicle. For instance, the location of the recommended emergency response vehicle, can be requested from the emergency services entity, determined from the signal sent from government alert system, or may be assumed to be in a vehicle storage area of the pertinent emergency services agency. Therefore, the mobility path of the recommendation can be optimized to cover a pathway from the point of dispatch to a point of interest, buffer zone, or emergency site, for the particularities of the emergency response vehicle. The vehicle coordinator 150 can also consider the presence, information, and autonomous capabilities of other vehicles to maintain or effectuate the mobility path as described in FIG. 3 above.

At block 516, the vehicle coordinator 150 transfers the mobility path recommendation to the emergency services entity. The method then proceeds to block 414 of FIG. 4, where the vehicle control algorithm 400 performs as described above.

While the foregoing is directed to embodiments of the present invention, other and further embodiments of the invention may be devised without departing from the basic scope thereof, and the scope thereof is determined by the claims that follow.

What is claimed is:

1. A method comprising:

identifying, by a vehicle coordinator in a computing environment, an emergency situation and a corresponding emergency site from emergency information data transmitted by an emergency services entity;

identifying, by the vehicle coordinator, emergency response factors in historical telematics data of historical emergency situations, wherein the emergency response factors include an emergency response vehicle type used in the historical emergency situations;

categorizing, by the vehicle coordinator, emergency situation outcomes based on the emergency response factors;

identifying, by the vehicle coordinator, one or more patterns between the emergency response factors and the emergency situation outcomes, wherein identifying, by the vehicle coordinator, one or more patterns further comprises:

generating a knowledge graph to identify the one or more patterns, where nodes of the knowledge graph represent the emergency response factors and the emergency situation outcomes, and weights of edges between nodes indicate a correlation between a given emergency response factor and an emergency situation outcome, wherein the correlation includes the correlation between a given emergency response vehicle type and the emergency situation outcomes;

generating, by the vehicle coordinator, a vehicle recommendation based on the identified patterns, wherein the vehicle recommendation references an emergency response vehicle based on the emergency response vehicle type;

determining, by the vehicle coordinator, a location of the emergency response vehicle referenced by the vehicle recommendation;

generating, by the vehicle coordinator, a mobility path recommendation based on the vehicle recommendation and the location of the emergency response vehicle referenced by the vehicle recommendation; and transmitting, by the vehicle coordinator, the vehicle recommendation and the mobility path recommendation to the emergency services entity.

2. The method of claim 1, wherein the emergency response factors comprise the emergency response vehicle type, and at least one of emergency situation duration, emergency situation type, emergency vehicle response time, traffic conditions, or weather conditions, and wherein the historical telematics data comprises information recorded from prior emergency situations.

3. The method of claim 1, wherein categorizing the emergency situation outcomes further comprises:

implementing a machine learning model to categorize the emergency situation outcomes based on the emergency response vehicle type used in each historical emergency situation for a given set of emergency response factors.

4. The method of claim 1, wherein generating the knowledge graph further comprises:

identifying the one or more patterns based on the weights of edges between nodes of the knowledge graph by identifying the edges with the greatest weights.

5. The method of claim 4, wherein the weights of the edges are increased for each occurrence of a given emergency response factor and an emergency situation outcome in the historical telematics data.

6. The method of claim 1, wherein the mobility path is a pathway from the emergency response vehicle referenced by the vehicle recommendation to at least one of: a buffer zone, an emergency site, or a point of interest in an emergency situation, and wherein the mobility path is unimpeded by another vehicle.

7. The method of claim 1, wherein generating the mobility path recommendation is further based on at least one of: autonomous capabilities, a location, a make and model, a size, a weight, or physical dimensions of another vehicle.

8. A system, comprising:

a processor; and memory or storage comprising an algorithm or computer instructions, which when executed by the processor, performs an operation comprising:

identifying, by a vehicle coordinator in a computing environment, an emergency situation and a corresponding emergency site from emergency information data transmitted by an emergency services entity;

identifying, by the vehicle coordinator, emergency response factors in historical telematics data of historical emergency situations, wherein the emergency response factors include an emergency response vehicle type used in the historical emergency situations;

categorizing, by the vehicle coordinator, emergency situation outcomes based on the emergency response factors;

identifying, by the vehicle coordinator, one or more patterns between the emergency response factors and the emergency situation outcomes, wherein identifying, by the vehicle coordinator, one or more patterns further comprises:

generating a knowledge graph to identify the one or more patterns, where nodes of the knowledge graph represent the emergency response factors and the emergency situation outcomes, and weights of edges between nodes indicate a correlation between a given emergency response factor and an emergency situation outcome, wherein the correlation includes the correlation between a given emergency response vehicle type and the emergency situation outcomes;

generating, by the vehicle coordinator, a vehicle recommendation based on the identified patterns, wherein the vehicle recommendation references an emergency response vehicle based on the emergency response vehicle type;

determining, by the vehicle coordinator, a location of the emergency response vehicle referenced by the vehicle recommendation;

generating, by the vehicle coordinator, a mobility path recommendation based on the vehicle recommendation and the location of the emergency response vehicle referenced by the vehicle recommendation; and transmitting, by the vehicle coordinator, the vehicle recommendation and the mobility path recommendation to the emergency services entity.

9. The system of claim 8, wherein the emergency response factors comprise the emergency response vehicle type, and at least one of emergency situation duration, emergency situation type, emergency vehicle response time, traffic conditions, or weather conditions, and wherein the historical telematics data comprises information recorded from prior emergency situations.

10. The system of claim 8, wherein categorizing the emergency situation outcomes further comprises:

implementing a machine learning model to categorize the emergency situation outcomes based on the emergency response vehicle type used in each historical emergency situation for a given set of emergency response factors.

11. The system of claim 8, wherein generating the knowledge graph further comprises:

identifying the one or more patterns based on the weights of edges between nodes of the knowledge graph by identifying the edges with the greatest weights.

12. The system of claim 11, wherein the weights of the edges are increased for each occurrence of a given emergency response factor and an emergency situation outcome in the historical telematics data.

13. The system of claim 8, wherein the mobility path is a pathway from the emergency response vehicle referenced by the vehicle recommendation to at least one of: a buffer zone, an emergency site, or a point of interest in an emergency situation, and wherein the mobility path is unimpeded by another vehicle.

14. The system of claim 8, wherein generating the mobility path recommendation is further based on at least one of: autonomous capabilities, a location, a make and model, a size, a weight, or physical dimensions of another vehicle.

15. A non-transitory computer-readable storage medium having computer-readable program code embodied therewith, the computer-readable program code executable by one or more computer processors to perform an operation comprising: identifying, by a vehicle coordinator in a computing environment, an emergency situation and a corresponding emergency site from emergency information data transmitted by an emergency services entity identifying, by the vehicle coordinator, emergency response factors in historical telematics data of historical emergency situations, wherein the emergency response factors include an emergency response vehicle type used in the historical emergency situations; categorizing, by the vehicle coordinator, emergency situation outcomes based on the emergency response factors; identifying, by the vehicle coordinator, one or more patterns between the emergency response factors and the emergency situation outcomes, wherein identifying, by the vehicle coordinator, one or more patterns further comprises: generating a knowledge graph to identify the one or more patterns, where nodes of the knowledge graph represent the emergency response factors and the emergency situation outcomes, and weights of edges between nodes indicate a correlation between a given emergency response factor and an emergency situation outcome, wherein the correlation includes the correlation between a given emergency response vehicle type and the emergency situation outcomes; generating, by the vehicle coordinator, a vehicle recommendation based on the identified patterns, wherein the vehicle recommendation references an emergency response vehicle based on the emergency response vehicle type; determining, by the vehicle coordinator, a location of the emergency response vehicle referenced by the vehicle recommendation; generating, by the vehicle coordinator, a mobility path recommendation based on the vehicle recommendation and the location of the emergency response vehicle referenced by the vehicle recommendation; and transferring transmitting, by the vehicle coordinator, the vehicle recommendation and the mobility path recommendation to the emergency services entity.

16. The computer program product of claim 15, wherein the emergency response factors comprise the emergency response vehicle type, and at least one of emergency situation duration, emergency situation type, emergency vehicle response time, traffic conditions, or weather conditions, and wherein the historical telematics data comprises information recorded from prior emergency situations.

17. The computer program product of claim 15, wherein categorizing the emergency situation outcomes further comprises:

implementing a machine learning model to categorize the emergency situation outcomes based on the emergency response vehicle type used in each historical emergency situation for a given set of emergency response factors.

18. The computer program product of claim 15, wherein generating the knowledge graph further comprises:

identifying the one or more patterns based on the weights of edges between nodes of the knowledge graph by identifying the edges with the greatest weights.

19. The computer program product of claim 18, wherein the weights of the edges are increased for each occurrence of a given emergency response factor and an emergency situation outcome in the historical telematics data.

20. The computer program product of claim 15, wherein the mobility path is a pathway from the emergency response vehicle referenced by the vehicle recommendation to at least one of: a buffer zone, an emergency site, or a point of interest in an emergency situation, and wherein the mobility path is unimpeded by another vehicle.

* * * * *